Aug. 28, 1951     P. C. WILSON     2,566,150

BRAKE ADJUSTING MECHANISM

Filed Oct. 26, 1948     2 Sheets-Sheet 1

INVENTOR
Palmer Clyde Wilson
by his attys
Webb Mackey + Burden

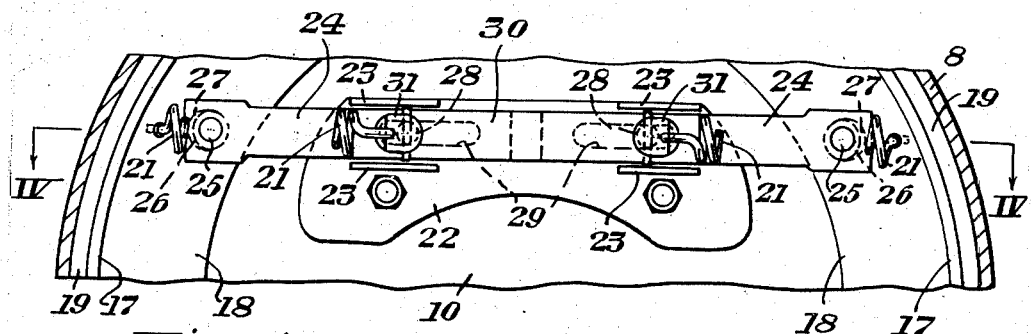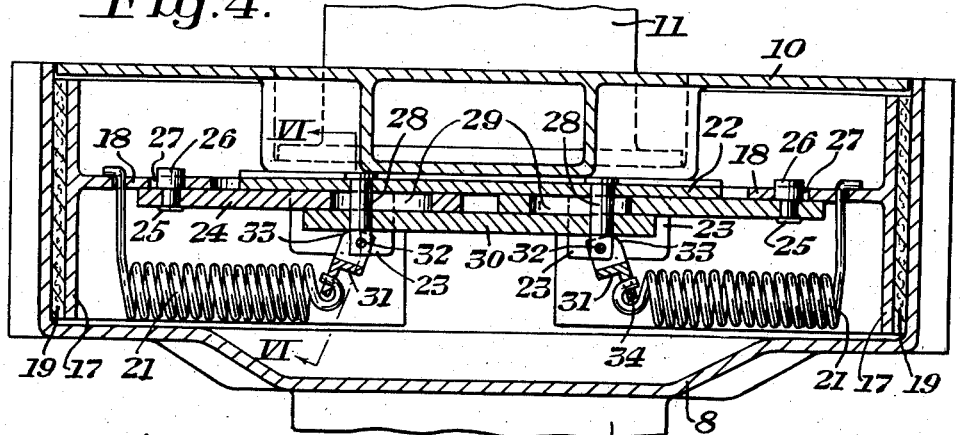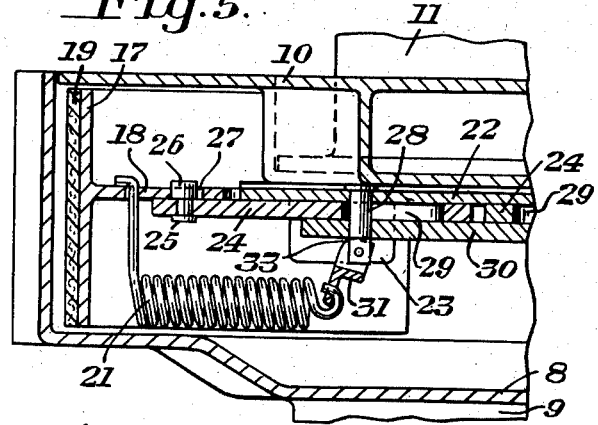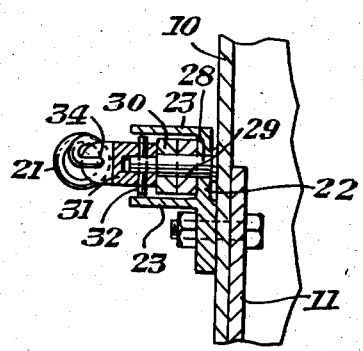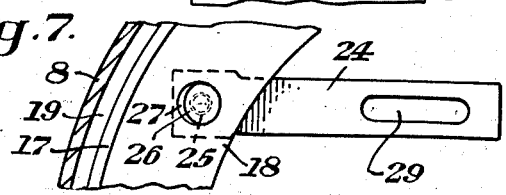

Patented Aug. 28, 1951

2,566,150

UNITED STATES PATENT OFFICE 2,566,150

BRAKE ADJUSTING MECHANISM

Palmer Clyde Wilson, Uniontown, Pa.

Application October 26, 1948, Serial No. 56,561

7 Claims. (Cl. 188—79.5)

This application relates to a brake adjuster for brakes of the type having a drum affixed to a rotating member and a shoe which is pivoted to a fixed support and which is pressed against the drum to obtain braking action. My brake adjuster is especially intended for wheel brakes on automobiles and trucks and therefore it will be described with reference thereto.

It is obviously desirable that automobile brakes act as quickly as possible whenever the driver applies the brakes. Accordingly, only a very small clearance is provided between the drum and the shoe when the brakes are released. Generally, this clearance is one ten-thousandth of an inch. Consquently, when an automobile driver applies the brakes by pressing a brake pedal only a slight amount of travel of the pedal is required to obtain braking action provided, of course, the hydraulic system or the mechanical linkage between the pedal and the brakes is in proper operating condition.

As the shoes wear from use, however, the shoes must be moved more than the normal amount to contact the drum and the driver must move the brake foot pedal a corresponding further distance. Quick braking action, therefore, cannot be obtained. I provide a construction whereby automatic compensation can be made for the wearing of the shoes so that quick braking action can be obtained at all times. I employ a simple mechanical construction which, when the brakes are released, maintains the proper clearance between the drum and shoes. I provide bars slidably held by the fixed support on which the shoes are pivoted, which bars move with the shoe only in one direction, i. e., towards the drum, and which prevent movement of the shoe away from the drum beyond the prescribed clearance between the shoes and the drum.

In the accompanying drawings I have illustrated a present preferred embodiment of my invention, in which Figure 1 is a front elevation partially in section of an automobile brake embodying my invention, the section being taken on the lines I—I of Figure 2;

Figure 3 is a fragmentary view similar to Figure 1 but on an enlarged scale;

Figure 4 is a section along the lines IV—IV of Figure 3;

Figure 5 is a fragmentary section similar to Figure 4 but showing the brakes released;

Figure 6 is a section along the lines VI—VI of Figure 4; and

Figure 7 is a detail view of the bar and shoe.

Figure 1:
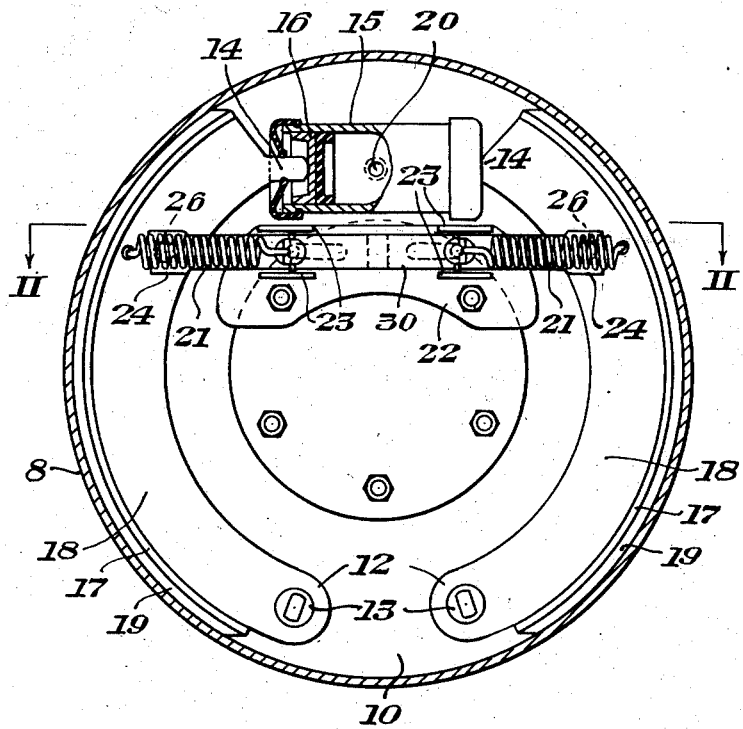
Figure 2:
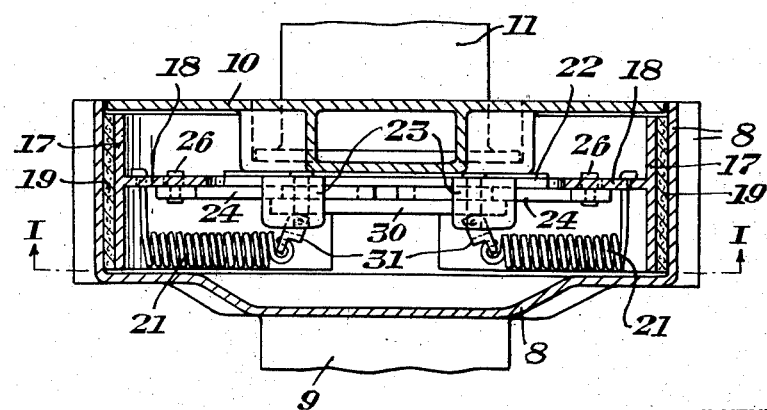
Figure 2 is a horizontal section on the lines II—II of Figure 1.

Figure 1 shows an automobile wheel brake having a drum 8 which is secured to an automobile wheel by means, for example, of a hub 9. A plate 10 secured to an axle housing 11 (in the case of the rear wheel of an automobile) or secured to a stationary part of a front axle supports brake shoes 12. The shoes are pivoted to the plate 10 about pins 13. The other ends of the shoes carry short pins 14 which extend into the open ends of a wheel cylinder 15 and engage pistons 16 in the cylinder. Each shoe 12 comprises a plate 17 having a central reinforcing flange 18 and a lining 19 which actually engages the drum 8. When the automobile driver applies the brakes, he presses a foot pedal which supplies fluid under pressure to the wheel cylinder 15 through the opening 20 by a piston and cylinder and conduit not shown. The pistons 16 move outwardly in the cylinder and thus rotate the brake shoes about the pins 13 to engage the drum. When the brakes are released wheel springs 21 secured to the flanges 18 of the shoes and to my brake adjuster, as will hereinafter be described, withdraw the shoes from the drum and force fluid out of the wheel cylinder 15. With the exception of the connection of one end of the wheel springs 21 to my adjusting mechanism, the parts so far described are conventional.

Figures 3, 4 and 5 show my brake adjuster in detail. The adjuster comprises a base 22 secured to the plate 10 and having flanges 23 which extend at right angles to its outer surface to form a channel or guide for each of two bars 24, one of which is provided for each shoe. Each bar 24 has a pin 25 adjacent its end near the shoe. Each pin has an enlarged portion or stud 26 which extends through an opening 27 formed in the flange 18 of the shoe. As appears in Figures 3 and 7 of the drawings, the enlarged portion or stud 26 is oval in cross-section and the opening 27 in the flange 18 is circular, the major axis of the oval stud 26 being very slightly less than the diameter of the opening 27. As is best shown in Figure 7, there is thus a small lateral clearance between the stud 26 and the opening 27. For reasons later explained, the clearance between the stud 26 and the opening 27 is the same as the prescribed clearance between the drum 8 and the lining 19 of the shoes when the brakes are released.

A pin 28 extends from the base 22 between the flanges 23 and through a longitudinal slot 29 formed in each bar. The pin also passes through a plate 30 which is placed against both of the bars 24. The end extending beyond the plate 30 is flattened to provide a pivot point for a cam lever 31 which is slotted to fit over the flattened end of the pin 28 and which rotates about a pin 32 extending transversely through the pin 28 and the lever 31. As appears in Figures 4 and 6, the cam lever 31 is pivoted adjacent one end so as to provide a long and a short lever arm. The short lever arm is rounded as at 33 to engage the plate 30 when the lever is rotated clockwise viewing Figure 5. The long arm of the lever 31 has a hole 34 through which one end of a wheel spring 21 is connected.

The springs 21 are connected to the brake shoes and to the cam levers so that they are under tension even when the brakes are not applied. Since the springs pull on the long arms of the levers 31, the short arms of the levers press against the plate 30 with considerable force and that plate in turn presses against the bars 24 to clamp them to the base 22 between the flanges 23. The levers 31 and the plate 30 thus form clamps which hold the bars 24 in position when the brakes are in adjustment. The levers 31 can also be used as clamps by themselves. Thus, the plate 30 can be removed and the pins 28 shortened so that the short arm of the levers 31 bear directly against the bars 24. However, I prefer to use the plate 30 since it provides a larger area of contact with the bars 24.

The operation of my adjuster will now be described. When the driver applies the brakes, each brake shoe is rotated about the pivots 13 until the lining 19 engages the drum. During this motion the inner edge of the opening 27 in the flange 18 of each shoe engages the stud 26 and the bar 24 is moved outwardly towards the drum through the channels or guides 23. The force exerted by the wheel cylinder is sufficient to move both the shoes and the bars 24 outwardly even though the bars are clamped against the base 22. This leaves a space between the side of the oval stud and the outer edge of the opening which, by proper dimensioning of the stud and the opening, is equal to the prescribed clearance between the shoe lining and the drum when the brakes are released. The width of the space is the difference between the diameter of the opening 27 in each shoe and the length of the minor axis of the oval stud. The major axis of the stud is made only slightly less than the diameter of the opening so as to limit vertical movement of the stud.

When the driver releases the brakes, the shoes are withdrawn from the drum by the spring 21. Each shoe goves inwardly away from the drum until the outer edge of the opening 27 contacts the stud 26. Further inward motion is not possible because the springs 21 do not have sufficient strength to move the bars 24 inwardly against the clamping action of the plate 30 and the cam levers 31. This is due in large measure to the very considerable difference in leverage between the long arm of the lever 31 which is connected to the spring and the arm of the lever 31 which presses against the plate 30. It results, therefore, that the shoes withdraw from the drum only the amount of the prescribed clearance. As the lining of the brake shoes wears the bars 24 will move outwardly towards the drum when the brakes are applied until the lining presses against the drum sufficiently to give good braking action. The bars cannot, however, move away from the drum when the brakes are released, with the result that the proper clearance between the lining and the drum is always maintained.

From the foregoing, it is believed to be apparent that my brake adjuster is of very simple construction which will not readily get out of order and which requires no maintenance. It will maintain the correct clearance between the brake shoes and the drum at all times. My adjuster will also assist a driver to stop his vehicle in case it should "throw" a wheel. If the accident happened to a vehicle not equipped with my adjuster and the driver tried to stop the car by applying the brakes, fluid pressure supplied to the wheel cylinder 15 would force the pistons 16 all the way out of the cylinder and destroy the pressure throughout the hydraulic system in which case none of the brakes could be applied. This could not occur on cars or trucks equipped with my adjuster because the inner end of the slots 29 of the bars 24 would contact the pins 28 before the pistons 16 left the cylinder 15. Pressure in the system would not be lost and the driver would have available the braking action of the other wheels.

While I have described a present preferred embodiment of my invention, it is to be understood that it may be otherwise embodied within the scope of the appended claims.

I claim:

1. Adjusting mechanism for brakes having a drum and a pivoted shoe which is applied against the drum to obtain braking action, said mechanism comprising a bar, a lost motion connection between the bar and the shoe permitting relative movement between the bar and the shoe in the line of travel of the shoes toward and away from the drum, a clamp engaging the bar and restraining movement thereof when the brakes are released and a spring secured to the shoe and to the clamp to actuate the clamp and to withdraw the shoe from the drum when the brake is released.

2. Adjusting mechanism for brakes having a drum and a pivoted shoe which is applied against the drum to obtain braking action, said mechanism comprising a bar, a stud adjacent one end of the bar adapted to extend into an opening in the shoe at a point spaced from the pivot point of the shoe, the dimensions of the opening and of the stud permitting limited movement of the stud in the opening, a clamp engaging the bar and restraining movement thereof when the brakes are released and a spring secured to the shoe and to the clamp to actuate the clamp and to withdraw the shoe from the drum when the brake is released.

3. Adjusting mechanism for brakes having a drum and a pivoted shoe which is applied against the drum to obtain braking action, said mechanism comprising a bar, a stud adjacent one end of the bar adapted to extend into an opening in the shoe at a point spaced from the pivot point of the shoe, the dimensions of the opening and of the stud permitting movement of the stud in the opening, a clamp engaging the bar and restraining movement thereof when the brakes are released, and a spring secured to the shoe and to the clamp to actuate the clamp and to withdraw the shoe from the drum when the brake is released, the tension of said spring being such as to permit movement of the bar with the shoe towards the drum when the brakes are applied.

4. Adjusting mechanism for brakes having a drum affixed to a rotating part, a shoe pivoted to a fixed support and means to move the shoe about its pivot to engage the drum and thereby obtain braking action, said mechanism comprising a bar, a stud adjacent one end of the bar adapted to extend into an opening in the shoe at a point spaced from the pivot point of the shoe, the dimensions of the opening and of the stud permitting movement of the stud in the opening, a base on the fixed support for guiding the bar, a clamp on the base pressing the bar against the base, and a spring secured to the shoe and to the clamp to actuate the clamp and to withdraw the shoe from the drum when the brake is released.

5. Adjusting mechanism for brakes having a drum affixed to a rotating part, a shoe pivoted to a fixed support and means to move the shoe about its pivot to engage the drum and thereby obtain braking action, said mechanism comprising a bar, a stud adjacent one end of the bar adapted to extend into an opening in the shoe at a point spaced from the pivot point of the shoe, the dimensions of the opening and of the stud permitting movement of the stud in the opening, means on the fixed support to support the bar and permit movement of the bar with the shoe when the brake is applied, a clamp engaging the bar, and a spring secured to the shoe and to the clamp to actuate the clamp and to withdraw the shoe from the drum when the brake is released.

6. Adjusting mechanism for brakes having a drum affixed to a rotating part, a shoe pivoted to a fixed support and means to move the shoe about its pivot to engage the drum and thereby obtain braking action, said mechanism comprising a bar, a stud adjacent one end of the bar adapted to extend into and opening in the shoe at a point spaced from the pivot point of the shoe, the dimensions of the opening and of the stud permitting movement of the stud in the opening, a guide on the fixed support in which the end of the bar opposite to the stud may move, a slot in the bar adjacent said end in the guide, a pin extending through said slot, a lever pivoted on the pin and having one end adapted to press against the bar to restrain movement thereof when the brakes are released, and a spring secured to the other end of said lever and to the shoe to actuate the lever against the bar and to withdraw the shoe from the drum when the brake is released.

7. Adjusting mechanism for brakes having a drum affixed to a rotating part, a shoe pivoted to a fixed support and means to move the shoe about its pivot to engage the drum and thereby obtain braking action, said mechanism comprising a bar, a stud adjacent one end of the bar adapted to extend into an opening in the shoe at a point spaced from the pivot point of the shoe, the dimensions of the opening and of the stud permitting movement of the stud in the opening, a guide on the fixed support in which the end of the bar opposite to the stud may move, a slot in the bar adjacent said end in the guide, a pin extending through said slot, a plate in the guide adjacent the bar, a lever pivoted in the pin and having one end adapted to press against the plate to force it against the bar and thereby restrain movement of the bar when the brakes are released, and a spring secured to the other end of said lever and to the shoe to actuate the lever against the plate and to withdraw the shoe from the drum when the brake is released.

PALMER CLYDE WILSON.

REFERENCES CITED

The following references are of record in the file of this patent:

UNITED STATES PATENTS

| Number | Name | Date |
|---|---|---|
| 2,241,479 | Rush | May 13, 1941 |
| 2,286,711 | Buffington | June 16, 1942 |
| 2,463,092 | Ensinger et al. | Mar. 1, 1949 |